United States Patent [19]

Batelaan

[11] Patent Number: 4,957,332
[45] Date of Patent: Sep. 18, 1990

[54] TRACK WHEEL

[75] Inventor: Joost Batelaan, Scarborough, Canada

[73] Assignee: National Research Council Canada/Conseil National de Recherches Canada, Ottawa, Canada

[21] Appl. No.: 347,008

[22] Filed: May 4, 1989

[30] Foreign Application Priority Data

May 5, 1988 [CA] Canada .................................. 566076

[51] Int. Cl.⁵ ............................................. B62D 55/18
[52] U.S. Cl. ....................................... 305/39; 305/53; 180/9.1; 152/5
[58] Field of Search ....................... 301/5 R; 152/1, 5; 305/1, 2, 3, 6, 7, 35 R, 35 EB, 39, 53, 60; 180/6.2, 6.7, 8.7, 9.0, 9.1

[56] References Cited

U.S. PATENT DOCUMENTS

| 905,405 | 12/1908 | Britton | 180/9 X |
| 2,055,932 | 9/1936 | Kitchen | 305/39 |
| 2,806,291 | 9/1957 | Robertson | 152/5 X |
| 4,386,809 | 6/1983 | Lapsys | 305/39 X |
| 4,752,105 | 6/1988 | Barnard | 180/9.1 X |

FOREIGN PATENT DOCUMENTS

| 68894 | 6/1892 | Fed. Rep. of Germany | 305/39 |
| 565512 | 1/1924 | France | 305/39 |
| 271861 | 1/1928 | United Kingdom | 152/5 |

Primary Examiner—Russell D. Stormer
Attorney, Agent, or Firm—A. W. Breiner

[57] ABSTRACT

A track wheel consisting of a longitudinal curved track mounted in an oval geometry on two support rollers. The track wheel is in effect an oval wheel with two axles. The axles of the two support rollers are mounted either directly or indirectly to the vehicle. The rollers support and guide both ends of the track in the small curvatures and transfers vehicle load to a surface at the lower curved part of the track. The track will withstand a high bending load in one direction, where it engages a surface, but it will also bend easily in the other direction, as it is guided over the two support rollers.

6 Claims, 2 Drawing Sheets

TRACK WHEEL

This invention relates to resilient vehicle suspension device and more particularly to a suspension means including a track entraining a pair of rollers to form a track wheel. Conventional tracked suspension devices utilize many support rollers, are of greater complexity and exhibit higher rolling resistance.

Ground engaging bands for supporting vehicles are known and such devices have been disclosed in U.S. Pat. No. 2,055,932 to Kitchen and U.S. Pat. No. 4,386,809 to Lapsys. The Lockheed Missile & Space Co. of Huntsville, Ala., U.S.A. has developed a similar vehicle. The bands or tracks differ from conventional tracks in that these bands or tracks function as resilient suspension devices. While it is desireable to have a more extensive area of contact between the track and the supporting surface it is also important to provide a track which will withstand a high bending load between the wheels supporting the track.

A track wheel, according to my invention, consists of a self supporting longitudinal curved track mounted in an oval geometry on two support rollers. The track wheel is in effect an oval wheel with two axles. The axles of the two support rollers are mounted to the vehicle. The rollers support and guide both ends of the track in the small curvatures and transfers vehicle load at the lower curved part of the track.

It is an object of the present invention to provide a track wheel having a relatively large foot print in soft ground, low rolling resistance in soft soil, snow, loose sand, and rough terrain; equivalent to rolling resistance of a round wheel of much greater height.

A further object of an embodiment of the invention is the provision of spring suspension which is an integral part of the spring track, in place of separate suspension and/or inflated tires.

A further object of an embodiment of the invention is the provision of a small mass of the spring track to provide superior suspension for light weight vehicles at higher speed as compared to wheels with tires and conventional spring suspension.

Furthermore another feature of this invention is that, compared to conventional segmented tracks, supported by many rollers, track wheels will have a much lower rolling resistance, lower weight and less wear due to the elimination of most of the supporting rollers.

Accordingly the present invention provides a suspension device for supporting a load such as a vehicle in rolling contact with a surface. The suspension means comprising a track which entrains a pair of spaced rollers so that a lower portion of the track intermediate the rollers which is in engagement with the surface defines an arc of between 15 degrees and 120 degrees and preferably between 20 degrees and 90 degrees when the device is in an unloaded condition. This invention further provides a track for mounting on a pair of load bearing rollers. The track having longitudinal curvature limiting means for resisting flattening beyond a predetermined maximum radius under load, but substantially free to bend to a smaller radius of curvature for passage around the rollers In the drawings which disclose preferred embodiment of the invention.

Figure 1:
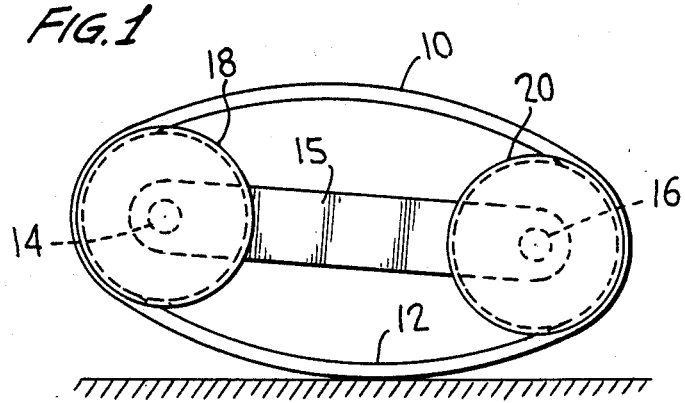
FIG. 1 is a schematic side elevational view of a track wheel of this invention.

With reference to FIG. 1 of the drawings a track wheel shown generally includes a band or track 10 with curvature limiting means, which entrains a pair of spaced apart rollers, a lower portion 12 of the track 10 intermediate the rollers is adapted to engage a surface and defines an arc of from 15 degrees to 120 degrees. This results in a ground or surface engaging portion having a large footprint of a wheel with diameter many times the height of track while maintaining a curved surface unsupported by bogey wheels or rollers found in conventional tracked vehicle.

Figure 2:
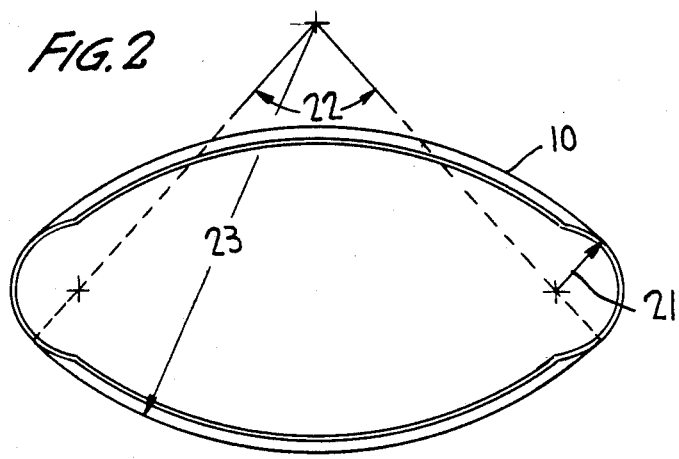
FIG. 2 is a side view of a spring track of this invention.
Figure 3:
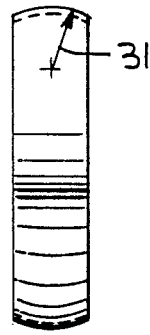
FIG. 3 is an end view of the track of FIG. 2

Referring now in detail to the drawings, a spring type track in accordance with this invention is shown generally in FIGS. 2 and 3. The spring track may be made from a thin spring steel band shown generally in FIG. 4 which is curved concave towards the centre, both longitudinally and transversely as detailed below. The band forms an oval shaped loop as shown in FIG. 2. The dual curved band will naturally take on this oval geometry when unloaded and unconfined. The unconfined spring track also retains a stable oval geometry when any segment of the track travels through all points of the oval loop.

Figure 4:
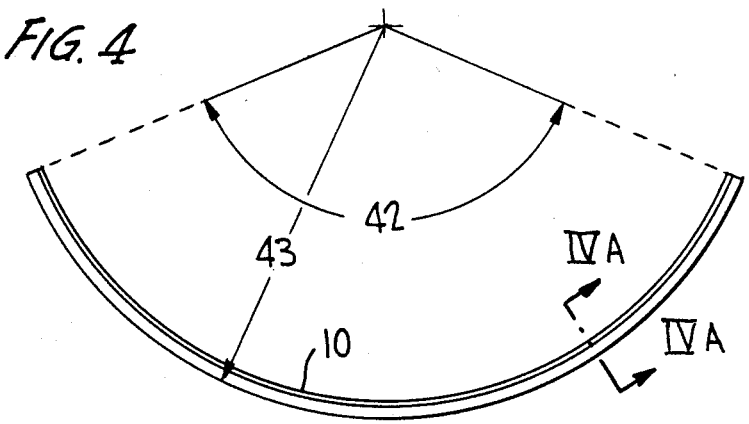
FIG. 4 is a side view of a dual curved band prior to having its ends connected to form a spring track loop.

The track is a continuous loop of a curved spring band made of spring steel or a fiber reinforced plastic composite, as shown in FIGS. 2 and 3. The track loop has a natural oval geometry with dimensions which are determined by its preformed longitudinal and transverse curvatures. The small curvatures of the oval geometry have the same radius 21 as the radius 31 of the transverse curvature of the preformed track ribbon; this is similar to the curvature of the bend in a spring steel measuring tape when it is folded lengthwise. The large curvatures of the oval shape are formed in the fabricating process. If the spring track is cut anywhere in the loop it will spring open to a longitudinal curved ribbon with the same radius 43 as the large radius 23 of the oval geometry and with an arc 42 of about 63 to 252 degrees, as shown in FIG. 4. These angles correspond to the arcs 22 of 15 and 120 degrees for the large radius portions of spring tracks where the small radius is one tenth the size of the large radius.

Figure 4A:
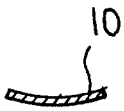
FIG. 4A is a cross section view of the dual curved band of FIG. 4.

FIG. 4A shows the cross section of the curved ribbon of FIG. 4 and of the spring track of FIGS. 2 and 3. This cross section is shown with a radial curvature and with uniform thickness. Curvatures other than radial, e.g. hyperbolic or parabolic and non uniform section thickness may also be used to obtain longitudinal curvature limiting characteristics.

Materials used for the spring track should have a high flexural fatigue strength and a low hysteresis loss factor. Rolling resistance of the spring track will increase with a higher hysteresis loss factor. This factor is a measure of the power dissipated as heat when the material is flexed or deformed. In general materials used for springs will be suitable for use on spring tracks. Reinforced plastic containing filaments such as Kevlar (Trade Mark) are also suitable. A rubber coating is preferably provided on the outer surface of the track.

The greatest track bending stresses occur in the lower part of the track, halfway between the two support rollers when the track rolls over a point support, e.g. a rock on a hard pavement. Under that condition and with maximum load the track should not buckle, that is the track should not bend longitudinally beyond a straight segment to an inverse curvature. Considering this limit, a maximum load for a track may be calculated. For instance, a steel spring track with a track thickness of 1 mm, a width of 10 cm, and a track length of 60 cm between centres of the support rollers will have a theoretical loading capacity of about 100 kg.

Figure 5:
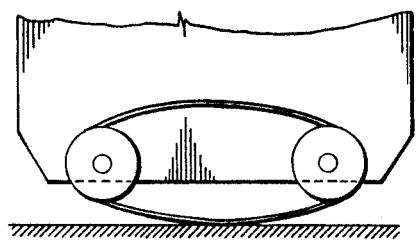
FIG. 5 is a side view of track mounting to a vehicle.

Tracks may be mounted on a track wheel frame 15 with bearings for axles 14 and 16 of the two support rollers 18 and 20 shown in FIG. 1. This frame is then attached to a vehicle. Alternatively, the track support rollers 18 and 20 may have bearings which fit on the two axles 14 and 16 which are attached directly to a vehicle as shown in FIG. 5.

The spring track of FIG. 2 must be installed on the support rollers 18 and 20 in an elongated, prestressed shape. The extent of prestressing may vary with the application. More prestressing will result in stiffer suspension and a longer footprint. Once the spring track in installed and maximum vehicle load is applied, the track should not stretch beyond the rollers. Under vehicle loading, the lower segment of the track will bend to a larger curvature while the top segment will bend back to a smaller curvature; closer to that of the unloaded track.

The vehicle is supported by the lower half of the track. The load force will bend the lower part of the track to a larger curvature. The greatest bending will occur at the point of contact. A reasonable limit is reached when the track is bent to a straight section. With reference to FIG. 1 a deflection limiting roller may be mounted on the lower part of the track wheel frame 15 between the track support rollers 18 and 20. The track will only engage this deflection limiting roller when vehicle load on the track wheel exceeds the load limits of the track.

The spring track wheel of FIG. 1 can also be compared to a wheel with an inflated tire which is suspended with springs and shock absorbers, as on automobiles. In that case the main advantage of a spring track wheel is the relative small mass of the deflected track segment as compared to the mass of a suspended wheel with tire.

Figure 6:
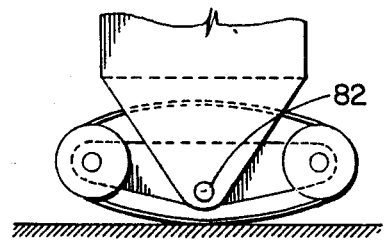
FIGS. 6 and 7 are side views of a track wheel mounting to a vehicle.
Figure 7:
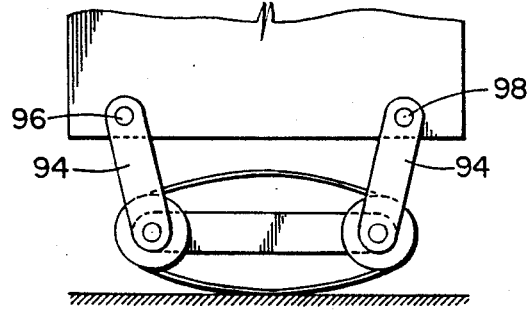

FIGS. 6 and 7 show swiveled mounting arrangements of a track wheel to a vehicle as an alternative to a fixed track wheel mounting shown in FIG. 5. This mounting allows the track wheel to swivel when it rolls over uneven terrain or when it encounters obstacles. Length of the swivel arms 94 and locations of swivel points 82, 96, 98 can be selected to provide a tilt up slant to the track wheel in the direction of rolling.

Figure 8:
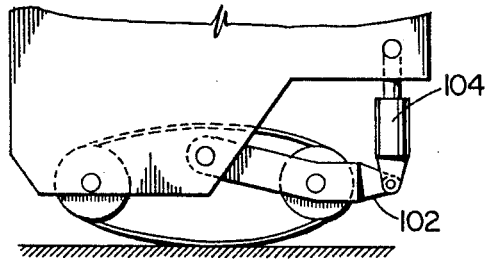
FIG. 8 is a side view of alternative means for mounting a track on a vehicle.

A semi-fixed mounting arrangement of a track wheel to a vehicle is shown in FIG. 8. One of the rollers is attached directly to the vehicle and the second roller is mounted on a swivel arm 102 in a manner that it will elongate the track when a load is applied on the wheel. Vehicle load is transferred to this second roller by means of a spring and damper 104 which is mounted between vehicle and the swivel arm to provide additional track wheel deflection and suspension.

A track wheel can be used on vehicles in place of conventional wheels. Track wheels can be applied on slow speed vehicles used on farms, construction sites or in open fields; other applications are track wheels for wheelbarrows, snowblowers, lawnmowers, wheelchairs and lawnchairs. Track wheels are also used advantageously on faster moving vehicles such as snowmobiles and in place of aircraft landing wheels.

I claim:

1. A self supporting track for mounting on a pair of load bearing rollers, said track comprising a continuous resilient band having longitudinal curvature limiting means for resisting flattening beyond a predetermined maximum radius under load, but substantially free to bend to a smaller radius of curvature for passage around said rollers, said longitudinal curvature limiting means being defined by a preformed longitudinal and transverse curvature whereby the unmounted track defines two opposite large radius arc portions and two smaller radius arc portions, said large radius arc portions between the rollers defining an arc of between 15 to 120 degrees, in an unloaded condition.

2. A track wheel device comprising the track of claim 1 mounted on a pair of load bearing rollers.

3. The device of claim 1 wherein the curvature of the track between the rollers defines an arc of between 20 to 90 degrees, in an unloaded condition.

4. The device of claim 1 wherein the transverse radius of curvature is approximately equal to the radius of the smaller arc portions.

5. The device of claim 1 wherein one of the rollers is pivotally linked to the other roller such that increased loading on the track increases the spacing between rollers.

6. The device of claim 1 further comprising step means for limiting the deflection of a surface engaging portion of the track.

* * * * *